Jan. 19, 1943. J. W. TATTER 2,308,961
BRAKE
Filed Aug. 2, 1940  3 Sheets-Sheet 1

INVENTOR
John W. Tatter

BY
Ely & Frye

ATTORNEYS

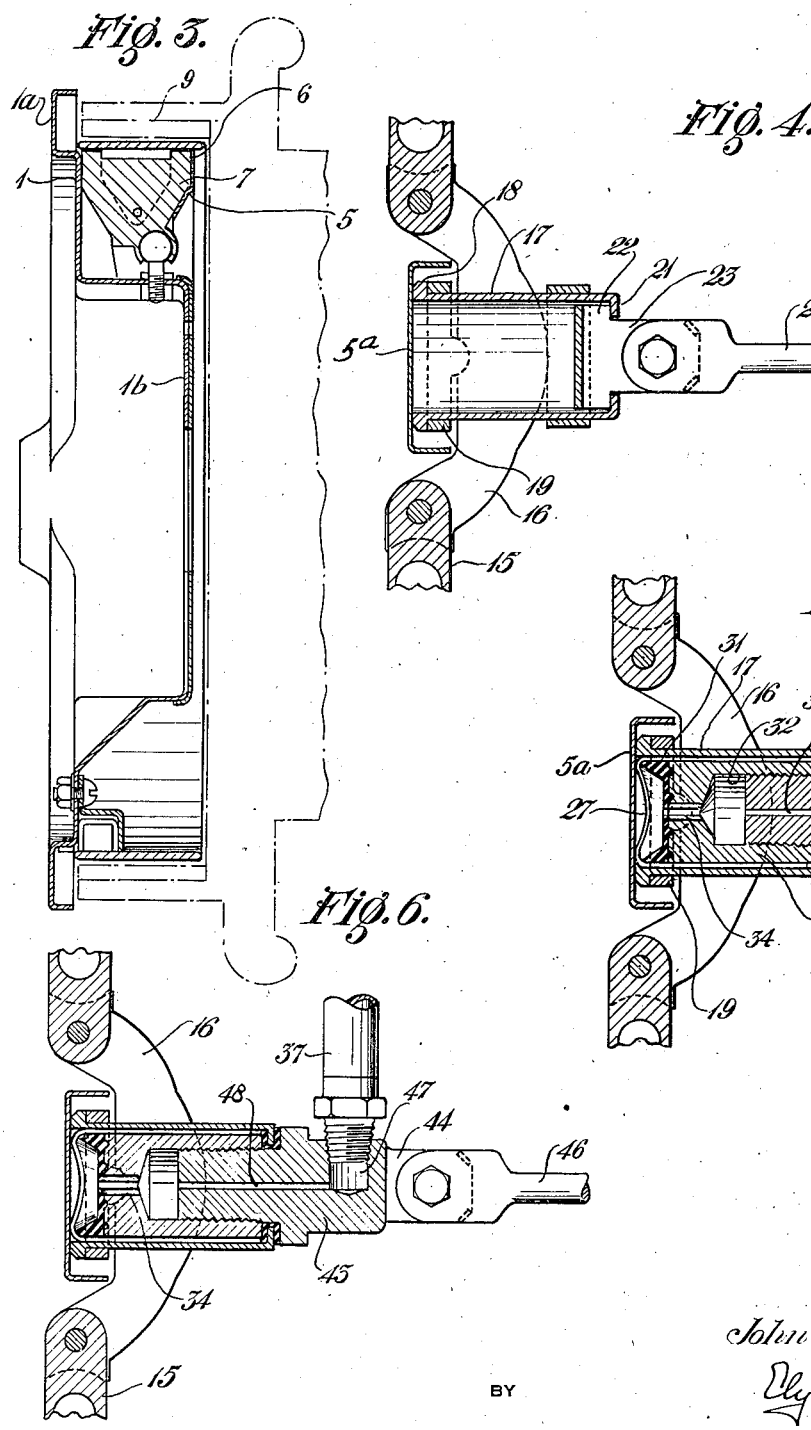

Jan. 19, 1943.  J. W. TATTER  2,308,961
BRAKE
Filed Aug. 2, 1940   3 Sheets-Sheet 3
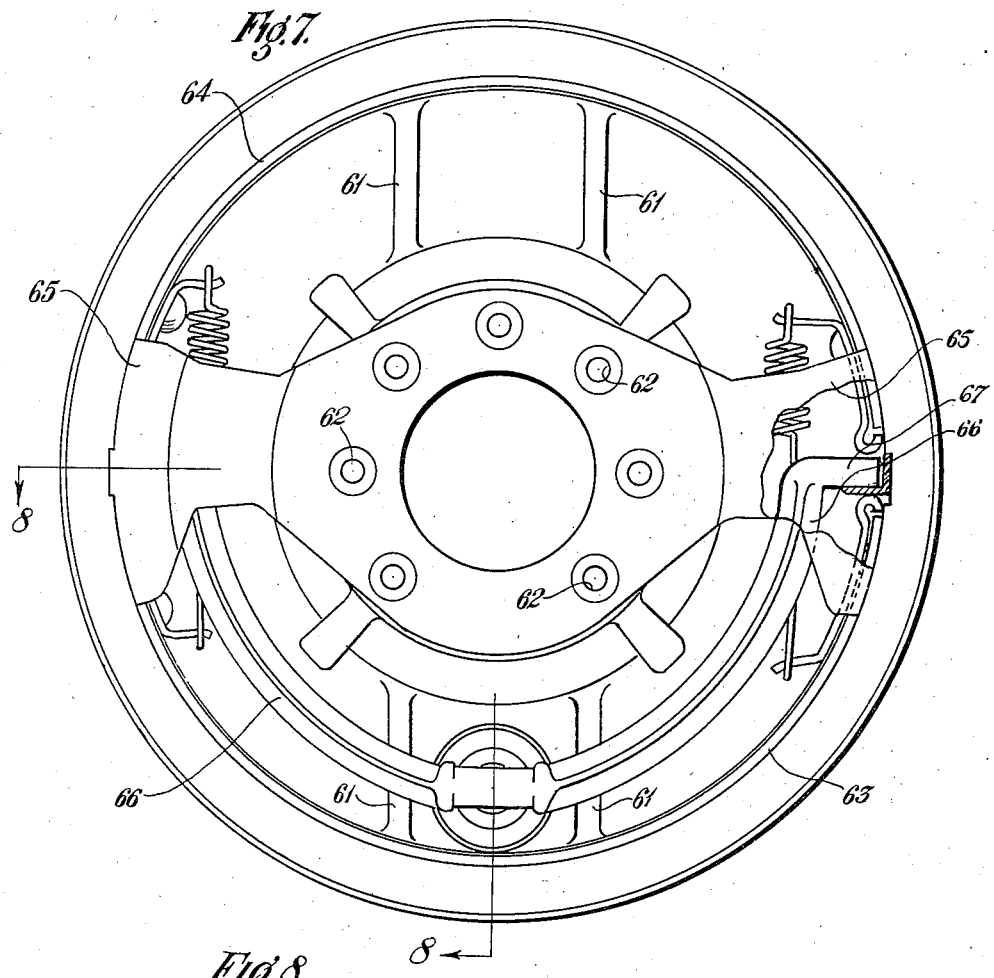
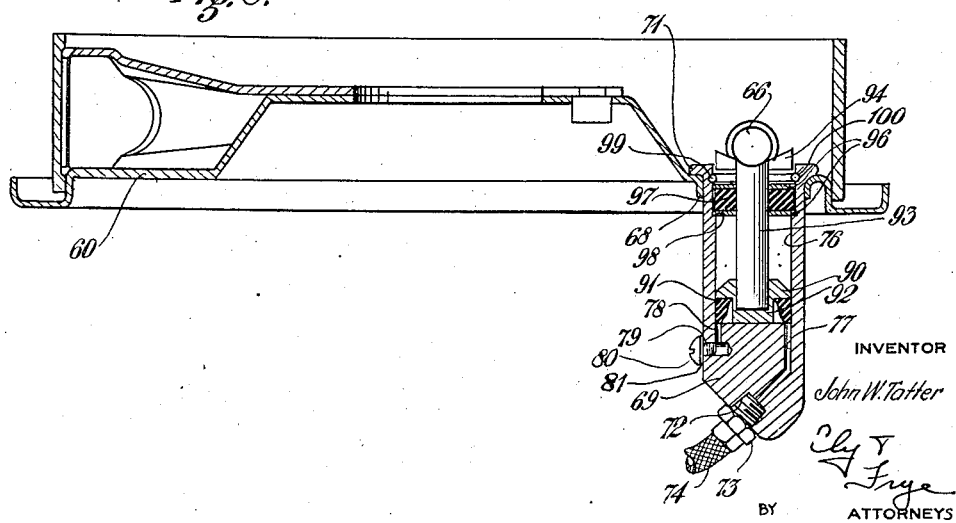
INVENTOR
John W. Tatter
BY
ATTORNEYS Patented Jan. 19, 1943

2,308,961

UNITED STATES PATENT OFFICE 2,308,961

BRAKE

John W. Tatter, Akron, Ohio, assignor to The Firestone Tire & Rubber Company, Akron, Ohio, a corporation of Ohio Application August 2, 1940, Serial No. 349,564

2 Claims. (Cl. 188—152)

This invention relates to brakes and more particularly to means for actuating the brake shoes.

A primary object of the invention is to provide a brake shoe actuating mechanism which may be used for mechanical or hydraulic operation.

Another object is to provide such a mechanism that is simple, light in weight, and inexpensive.

A further object is to provide such a brake shoe actuating mechanism which will be as foolproof as practical and will apply the actuating force to the shoes equally at all times.

Other and further objects will become apparent from the following description taken in connection with the accompanying drawings, in which:

Figure 3 is a sectional view of Figure 1 along the line 3—3;

Figure 4 is a partial sectional view of the actuating mechanism on line 4—4 of Figure 1, showing means for operating the mechanism mechanically;

Figure 5 is a partial sectional view of a modified form of the actuating mechanism showing hydraulic operating means;

Figure 6 is a partial sectional view of a further modified form of the invention;

Figure 7 is an elevation of a modified form of the brake mechanism and operating mechanism; and Figure 8 is a sectional view of Figure 7 on the line 8—8.

Figure 1:
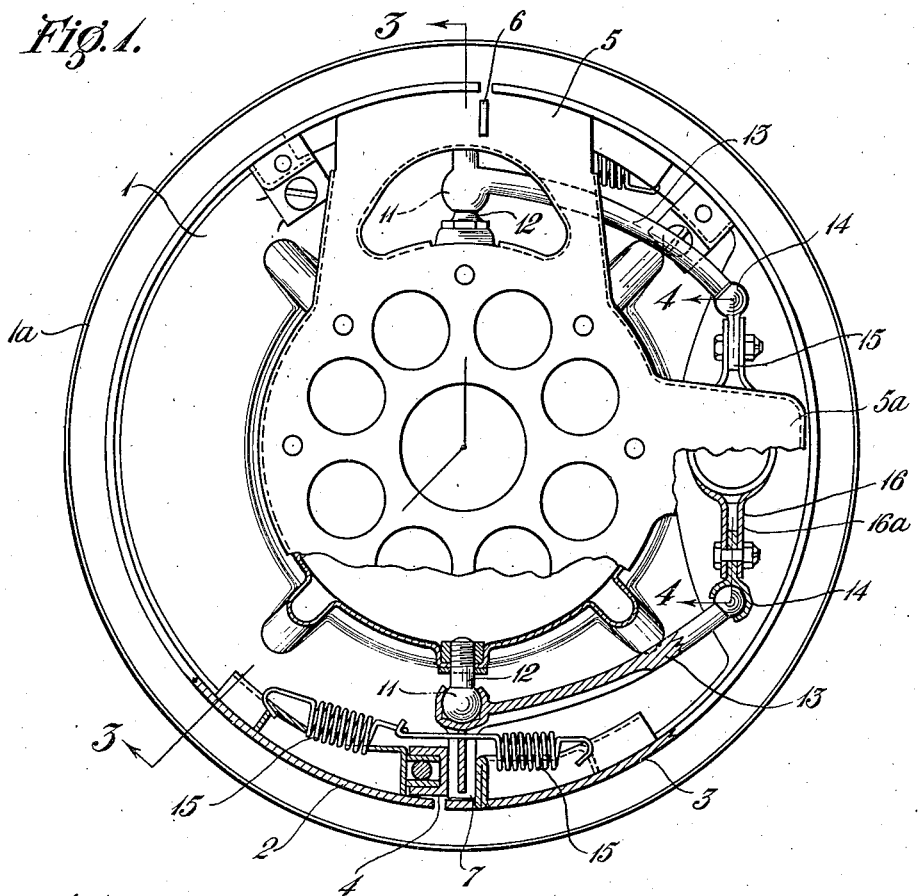
Figure 1 is a side elevation of the brake mechanism embodying the invention, looking from the wheel side of the brake.

The embodiment of the invention used for illustrative purposes, comprises a stationary torque or backing plate 1, suitably secured to the wheel spindle or axle for taking torque reactions. As shown in Figure 3, this torque plate 1 is a plate member which serves as a closure for the open side of the brake drum, and has an outer flange 1a and an offset central portion 1b which may be suitably attached by bolts to a flange (not shown) on the wheel spindle. A series of aligned bolt holes are provided by which both members 1 and 5 are to be secured to the spindle. A second plate member 5 extends diametrically across the brake mechanism and has its central portion attached, as by welding, to the central portion 1b of the torque plate 1. This construction provides a torque member with spaced bifurcated ends at diametrically opposite points of the brake mechanism. Suitable anchor members 4 and 6 extend between these bifurcated ends to serve as anchors for brake shoes 2 and 3. As shown in the lower part of Figure 1, the anchor members may be of U-shaped cross section, having tongues at their opposite ends which extend, respectively, through the plates 1 and 5 where they are suitably welded. Suitable cams 7 are provided between the anchor members 4 and 6 and one end of the respective shoes 2 and 3, and are adapted to move the brake shoes into engagement with the brake drum 9. One end of each of the brake shoes is provided with an adjusting means to regulate the clearance between the brake shoes and the drum when the brake mechanism is in released position. This adjusting mechanism is a conventional device shown in Figure 2, in which two opposed wedge members 10 and 10a may be moved relative to each other by means of the adjusting mechanism 10b. It will be readily understood that if the adjusting mechanism is so adjusted as to bring the wedge members 10 and 10a toward each other, the wedge shaped member 2a on the end of the brake shoe 2 will be moved to the left from the anchor member 4 to reduce the clearance between the brake shoe and the brake drum. Also, adjustment in the opposite direction will, of course, increase the clearance between the brake shoe and the brake drum. A similar adjusting mechanism is provided for the brake shoe 3 adjacent the anchor member 6, but since the construction is identical it is not believed that a repeated description is necessary.

The cams 7 are universally pivoted at 11 to ball heads on studs 12 fixed to the member 1. The cams 7 have integral lever arms 13, the ends of which terminate in ball heads 14, which are in turn pivotally connected to an equalizing member 16. This equalizing member 16 comprises two arms 16a, 16a, having central portions which are offset to straddle a brake shoe actuating means presently to be described. Suitable ball sockets 15, which engage the ball heads 14, have shanks which are sandwiched between the ends of the arms 16 and suitable bolts secure the respective ends of the arms and the shanks of the ball arms together. The equalizing member 16 is adapted to be operated mechanically as shown in Figure 4 or hydraulically as shown in Figures 5 and 6.

To this end, a cylindrical sleeve 17, having an annular, outwardly extending flange 18, carries a collar 19 which is pivotally associated with the equalizing member 16, which straddles the sleeve 17, to operate the equalizing member 16 when force is applied to the sleeve 17 to move it to the right, as viewed in Figures 4, 5, and 6. The construction is such as readily to permit the sleeve 17 to be operated by mechanical means through a direct pull on the right-hand end of the sleeve 17, or to be operated hydraulically through a piston arranged inside of the sleeve 17.

Referring specifically to Figure 4, it will be noted that the sleeve 17 has an inturned flange 21 on its outer end. For the purpose of providing an attaching boss or projection, a member 22 having a headed portion larger than the distance between the inner edges of the flange 21 is inserted in the cylinder 17. The member 22 has ears 23 to which a mechanical brake actuating means, such as a cable or rod 24 may be suitably attached. It will be readily apparent that the brake may be actuated by applying a force to the rod 24 to pull the sleeve 17 to the right.

In Figure 5, the mechanical actuating rod 24 of Figure 4 has been replaced by the hydraulic means. To this end, the sleeve 17 has a cylinder 26 having a spherically indented end 27 resting against an integral projection 5a on the backing plate member 5, which serves as a reaction member for the cylinder. A piston 29, having a rubber cup 31 vulcanized on the inner end thereof, is adapted to reciprocate in the cylinder 26. The piston has a threaded bore 32 adapted to receive a threaded hose connection nipple 33. The forward end of the piston has a passage 34, preferably hexagonal in shape, to receive an "Allen" wrench during assembly, and at the same time serve as a conduit to deliver fluid pressure from the bore 32 to the front face of the piston. The connecting nipple 33 has a flange 33a between which flange and the outer end of the piston 29, the inner flange 21 of the sleeve 27 is engaged. Suitable gaskets 36 are provided on each side of the flange 21 to form a fluid-tight seal between the piston 29 and the connection 33. Any suitable fluid conduit, 37, such as the usual flexible hydraulic brake hose, or metal tubing, is provided with the usual nipple 38, which is screw threaded into the connection nipple 33. A passage 35 connects the bore 32 in the piston with the bore into which the nipple 38 is threaded. The source of fluid pressure is not shown, but it is readily apparent that any suitable known means may be used to supply the brake actuating pressure. When fluid pressure is supplied through the conduit 37, and passage 34 to the front face of the piston, the cylinder 26 will react against the projection 5a and force the sleeve 17 to the right and through the agency of the collar 19, the equalizing member 16 operates the cams 7 to separate the ends of the brake shoes. The shoes are retracted by the springs 15 which also return the actuating mechanism to inoperative position.

In Figure 6 a construction similar to that of Figure 5 is provided, except that the connection nipple 33 of Figure 5 is replaced by a connection 43 which carries ears 44 to which a suitable cable or rod 45 may be attached for mechanical operation. The nipple 38 of the fluid conduit 37 is adapted to screw into a bore 47 in one side of the connection 43. A passage 48 connects the bore 47 with the passage 34 in the forward end of the piston. With the construction just described the brakes may be operated either mechanically or hydraulically. If desired, the usual hydraulic mechanism can be used for service braking and the mechanical connection may be utilized for parking or emergency operations.

A further modified form of the invention is shown in Figures 7 and 8. The torque plate member 60 is similar to that shown and described in connection with Figures 1 to 3, except that the torque plate 60 has transverse ribs 61 stamped therein. The purpose of these ribs is to strengthen the plate against reaction of the brake actuating mechanism for reasons which will readily appear hereinafter. A second torque plate member 65 extends substantially transversely of the brake mechanism and has its central portion welded to the offset portion of the plate member 60. By means of a series of bolts through aligned apertures 62 through the two members, the torque plate members may be suitably secured to a flange (not shown) on the wheel spindle. The anchor and adjusting means for the two brake shoes 63 and 64 are similar to those previously described in connection with Figures 1 to 3, and repetition of description is believed to be unnecessary. This modification differs from that of the previous figures only in the brake actuating mechanism which will now be described.

Figure 2:
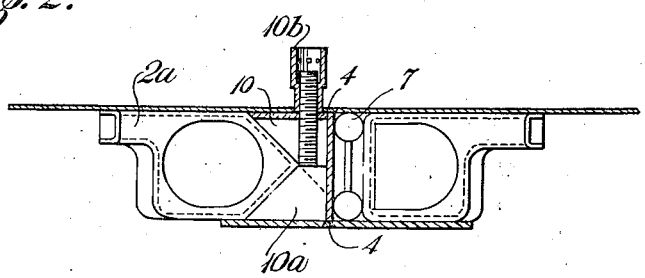
Figure 2 is an enlarged plan view of the brake shoe adjusting means of Figure 1.

A suitable semi-circular yoke member 66 carries integral cams 67 at each end thereof. The cams, per se, are similar to those shown in Figures 1 to 3. However, the ball and socket connection for the cams shown in Figures 1 to 3 is dispensed with, because the cams are integral with the yoke 67. Therefore, the cams 67 are free to float within certain limits between the anchor members and the ends of the adjacent shoes.

The torque plate member 60 is provided with a reinforced aperture 68 between the ribs 61 at one side of the brake mechanism. A cylinder member 69 having an integral outwardly extending flange 71 at the open end of the cylinder is adapted to engage the aperture 68 with the flange 71 engaging the back of the plate 60. The cylinder member 69 is provided with a suitable threaded bore 72 adapted to receive a connecting nipple 73 of a suitable fluid conduit 74. A cylindrical bore 76 is provided which serves as the cylinder proper. The bore 72 is in communication with the cylinder 76 by means of a passage 77. A suitable bleeding device for the cylinder 76 comprises a passage 78 which connects with a screw threaded bore 79 which extends from the outer surface of the cylinder member 69 and connects with the passage 78. A threaded screw 80 engages the bore 79. A suitable washer 81 made of soft metal, such as aluminum, is interposed between the head of the screw 80 and the flattened face on the outer side of the cylinder member 69. By means of the bleeder device any entrapped air in the cylinder 76 can be released and the soft metal washer serves as a tight seal when the screw is turned up tightly.

A suitable piston 90 inside the cylinder 76 is provided with a sealing cup washer 91. This cup washer is preferably made of rubber or other vulcanizable resilient plastic and is preferably vulcanized to the front face of the piston. A suitable boss 92 on the end of the piston serves as a stop when the piston is in inoperative position. A suitable piston rod 93 is suitably secured to the piston, such as by a press fit, and carries a suitable open stirrup 94 at its opposite end which engages the yoke member 66. A suitable guide and seal for the outer end of the piston rod comprises a plurality of spaced metal washers 96 between which a rubber washer 97 is held under compression. These washers are held in assembled relation between the inner end of a recess 98 in the cylinder 76 and a snap ring 99 which engages another recess 100 near the outer end of the cylinder member 69. It will be readily apparent that when fluid pressure is applied to the piston through the fluid conduit 74, the piston assembly will be moved to the right, as shown in Figure 8, thereby moving the yoke member 66 also to the right, which will in turn rock the cams 67 and move the adjacent ends of the brake shoes into engagement with the brake drum. The brakes will be released in the usual manner by suitable retracting springs which resiliently urge the brake shoes to the inoperative position.

The foregoing description has been more or less specific to a detailed construction. It is to be understood that this is not by way of limitation but merely for the purpose of illustrating the invention.

What is claimed is:

1. A braking mechanism comprising a brake drum, a pair of arcuate brake shoes floatably associated within said brake drum within small limits, a backing plate member, means on said backing plate member for limiting circumferential movement of one end of each of said brake shoes, a yoke member carrying integral operating cams at its ends thereof, and freely floating within said drum, and adapted to swing within the transverse limits of said drum, said cams being adapted to separate the adjacent ends of the brake shoes during pivotal movement of said yoke member, said backing plate member having a reinforced aperture therein in circumferentially spaced relation to the ends of said brake shoes, a cylinder extending through said aperture and engaging with the surface of said backing plate member adjacent said yoke member with the major portion of said cylinder projecting from the opposite side of said backing plate member, and a piston in said cylinder engaging said yoke member and adapted to push the latter away from said backing plate member when fluid pressure is applied to said piston and cylinder assembly.

2. A braking mechanism comprising a brake drum, a pair of arcuate brake shoes floatably associated within the brake drum, a backing plate member, means on said backing plate member for limiting circumferential movement of one end of each of said brake shoes, a yoke member carrying integral operating cams at its ends thereof, and freely floating within said drum, and adapted to swing within the transverse limits of said drum, said cams being adapted to separate the adjacent ends of said brake shoes during pivotal movement of said yoke member, an open-ended cylinder having an external flange at the open end thereof, said cylinder being disposed in an aperture in said backing plate member with said flange against said plate, a piston in said cylinder and operably engaging said yoke member adapted to push said yoke member away from said backing plate member when fluid pressure is applied to said piston and cylinder assembly.

JOHN W. TATTER.